US009673676B2

United States Patent
Kim et al.

(10) Patent No.: US 9,673,676 B2
(45) Date of Patent: Jun. 6, 2017

(54) SINGLE ROTOR TYPE MOTOR AND MANUFACTURNG METHOD THEREOF

(71) Applicant: AMOTECH CO., LTD., Incheon (KR)

(72) Inventors: Byung Soo Kim, Anyang-si (KR); Hyung Hwan Ko, Anseong-si (KR)

(73) Assignee: AMOTECH CO., LTD., Incheon (KR)

( * ) Notice: Subject to any disclaimer, the term of this patent is extended or adjusted under 35 U.S.C. 154(b) by 0 days.

(21) Appl. No.: 14/659,869

(22) Filed: Mar. 17, 2015

(65) Prior Publication Data

US 2015/0188378 A1    Jul. 2, 2015

Related U.S. Application Data

(62) Division of application No. PCT/KR2013/008378, filed on Sep. 16, 2013.

(30) Foreign Application Priority Data

Sep. 24, 2012 (KR) .......................... 10-2012-0105865

(51) Int. Cl.
*H02K 11/00* (2016.01)
*H02K 1/04* (2006.01)
(Continued)

(52) U.S. Cl.
CPC .............. *H02K 3/28* (2013.01); *H02K 1/187* (2013.01); *H02K 3/522* (2013.01);
(Continued)

(58) Field of Classification Search
CPC ........................................................ H02K 3/46
(Continued)

(56) References Cited

U.S. PATENT DOCUMENTS 7,615,907 B2 * 11/2009 Fei .......................... H02K 1/148
                                                           310/216.114
2005/0127775 A1 * 6/2005 Lee ......................... D06F 37/304
                                                           310/43
(Continued)

FOREIGN PATENT DOCUMENTS

JP          07023976          5/1995
JP       2003250252 A  *     9/2003
(Continued)

OTHER PUBLICATIONS

International Search Report—PCT/KR2013/008378 dated Dec. 12, 2013.

*Primary Examiner* — Jose Gonzalez Quinones
(74) *Attorney, Agent, or Firm* — Cantor Colburn LLP

(57) ABSTRACT

A single rotor type motor includes: a stator including a plurality of stator cores that are split and radially arranged, a bobbin made of an insulating material and wrapped on an outer surface of each of the stator cores, coils wound on an outer surface of the bobbin, an upper fixing plate disposed on the upper surfaces of the stator cores and on which the stator cores are radially arranged, and a lower fixing plate that is disposed on the lower surfaces of the stator cores and is coupled with the upper fixing plate; and a single rotor disposed with a certain gap from any one surface of an inner surface of the stator and an outer surface thereof. The plurality of wiring units for electrically connecting between the coils wound around each of the stator cores are formed integrally on the upper surface of the upper fixing plate.

5 Claims, 8 Drawing Sheets

(51) Int. Cl.
*H02K 3/48* (2006.01)
*H02K 3/34* (2006.01)
*H02K 3/28* (2006.01)
*H02K 3/52* (2006.01)
*H02K 15/095* (2006.01)
*H02K 1/18* (2006.01)
*H02K 15/00* (2006.01)
*H02K 15/02* (2006.01)

(52) U.S. Cl.
CPC ....... *H02K 15/0068* (2013.01); *H02K 15/026* (2013.01); *H02K 15/095* (2013.01); *H02K 2201/15* (2013.01); *Y10T 29/49009* (2015.01)

(58) Field of Classification Search
USPC .................................... 310/43, 71, 214, 215
See application file for complete search history.

(56) References Cited

U.S. PATENT DOCUMENTS

| | | | |
|---|---|---|---|
| 2010/0199725 A1* | 8/2010 | Lee ........................ | H02K 3/522 68/139 |
| 2011/0037331 A1* | 2/2011 | Jang ....................... | H02K 3/522 310/71 |
| 2011/0316365 A1 | 12/2011 | Kim | |
| 2012/0133225 A1* | 5/2012 | Mizuike ................ | H02K 1/146 310/71 |

FOREIGN PATENT DOCUMENTS

| | | | |
|---|---|---|---|
| KR | 2019980050529 | | 10/1998 |
| KR | 1020030037767 | | 5/2003 |
| KR | 1020050000245 | | 1/2005 |
| KR | 20110114150 A | * | 10/2011 |
| KR | 1020110139552 | | 12/2011 |

* cited by examiner

SINGLE ROTOR TYPE MOTOR AND MANUFACTURNG METHOD THEREOF

CROSS REFERENCE TO RELATED APPLICATIONS

This application is a divisional of International Application No. PCT/KR2013/008378, filed on Sep. 16, 2013, which claims priority to and the benefit of Korean Application No. 10-2012-0105865 filed on Sep. 24, 2012 in the Korean Patent Office, the entire contents of which are incorporated herein by reference.

TECHNICAL FIELD

The present invention relates to a single rotor type motor, and more particularly to a single rotor type motor and a manufacturing method thereof, in which wiring units for electrically connecting between stator coils are placed on a plate for fixing the stator cores, to thus enable easy assembly and solve a problem of coil disconnection.

BACKGROUND ART

Typically, a single rotor type motor includes a stator that receives power from an external power source and a rotor that is disposed with a certain gap on the outer circumferential surface or the inner circumferential surface of the stator and to which a rotating shaft is fixed.

The stator includes a stator core on which a plurality of iron pieces are stacked and formed and are arranged radially at regular intervals, a bobbin that is formed to be surrounded on the outer circumferential surface of the stator core and made of an insulating material, and coils that are wound around the outer circumferential surface of the bobbin.

The rotor includes a rotor support that is fixed to a rotating shaft, and a magnet that is mounted on the rotor support and that is arranged with a certain gap on the inner surface or the outer surface of the stator.

Here, the stator core is formed of individually divided split cores, and thus includes coil connection terminals for electrically connecting between coils wound around the cores.

A device for fixing terminals in bobbins for a conventional motor is disclosed in Korean Utility Model Registration 20-0159355. Each of the bobbins includes a coil winding portion on which coil wires for a circuit are wound. Each of the bobbins includes a plurality of slot grooves at one side thereof so that terminals are tight fitted with the slot grooves. Each of the terminals includes: a support surface that is inserted into the inner side of one slot groove; a first wiring unit that is bent and formed at one side end of the support surface so as to be inserted into one side of the slot groove and simultaneously to be protruded on the upper surface of the bobbin; and a second wiring unit that is bent and formed at the other side end of the support surface so as to be in contact with the side edge of the bobbin.

However, a structure of terminals for connecting coils of such a conventional motor has no structure of peeling off insulating outer sheaths of the coils and thus workers should strip out the insulating outer sheaths of the coils, to accordingly cause a complicated process.

Furthermore, the terminal fixing device of the conventional motor may cause the terminals to be seceded from the slot grooves, to accordingly cause a problem such as disconnection of the coils.

SUMMARY OF THE INVENTION

To solve the above problems or defects, it is an object of the present invention to provide a single rotor type motor in which wiring units for connecting between coils wound on respective stator cores are provided on a fixing plate on which the split stator cores are fixed in a radial form, to thus simplify wiring of the coils and to thus prevent occurrence of disconnection of the coils.

It is another object of the present invention to provide a single rotor type motor in which a coil terminal is formed integrally with a blade and thus when the coil terminal is inserted into a terminal pocket, insulating outer sheaths of coils are peeled off by the blade and fixed to the coil terminal, to thereby make a separate process of peeling off the insulating outer sheaths of the coils unnecessary, and simplify a manufacturing process of the single rotor type motor.

The objects of the present invention are not limited to the above-described objects, and other objects and advantages of the present invention can be appreciated by the following description and will be understood more clearly by embodiments of the present invention.

To accomplish the above and other objects of the present invention, according to an aspect of the present invention, there is provided a single rotor type motor comprising: a stator including a plurality of stator cores that are split and radially arranged, a bobbin made of an insulating material and wrapped on an outer surface of each of the stator cores, coils wound on an outer surface of the bobbin, an upper fixing plate that is disposed on the upper surfaces of the stator cores and on which the stator cores are radially arranged, and a lower fixing plate that is disposed on the lower surfaces of the stator cores and is coupled with the upper fixing plate; and a single rotor disposed with a certain gap from any one surface of an inner surface of the stator and an outer surface thereof, wherein a plurality of wiring units for electrically connecting between the coils wound around each of the stator cores are formed integrally on the upper surface of the upper fixing plate, and each of the wiring units comprises: a terminal pocket that is integrally formed on the upper surface of the upper fixing plate and into which the coils are inserted; and a coil terminal that is made of a metallic material that can be electrified and is inserted into the terminal pocket for electrically connecting between the coils.

The stator core according to the present invention comprises: a rod portion of a plate shape and around which the coils are wound; a tooth portion that is extensibly formed in a lateral direction on one end of both ends of the rod portion and that is disposed facing a magnet of the rotor; and a flange portion that is formed at the other side end of the rod portion, in which the flange portion comprises: a connecting portion for mutually connecting between the stator cores; and a bolt fastening hole for coupling the stator core, the upper fixing plate, and the lower fixing plate with a bolt.

As described above, a single rotor type motor according to the present invention is configured to include wiring units for electrically connecting between coils wound around stator cores are formed on the upper surface of an upper fixing plate on which the split stator cores are radially fixed, in which a terminal pocket into which coils of each of the wiring units are inserted is integrally formed on the upper surface of the upper fixing plate, to thus enable easy manufacturing, simplify coil wirings, and prevent occurrence of disconnection of the coils.

Further, the single rotor type motor according to the present invention is configured to form a coil terminal integrally with a blade, to thus peel off insulating outer sheaths of coils by the blade and fixed to the coil terminal, when the coil terminal is inserted into a terminal pocket, to thereby make a separate process of peeling off the insulating outer sheaths of the coils unnecessary, and simplify a manufacturing process of the single rotor type motor.

DETAILED DESCRIPTION OF THE INVENTION

Figure 1:
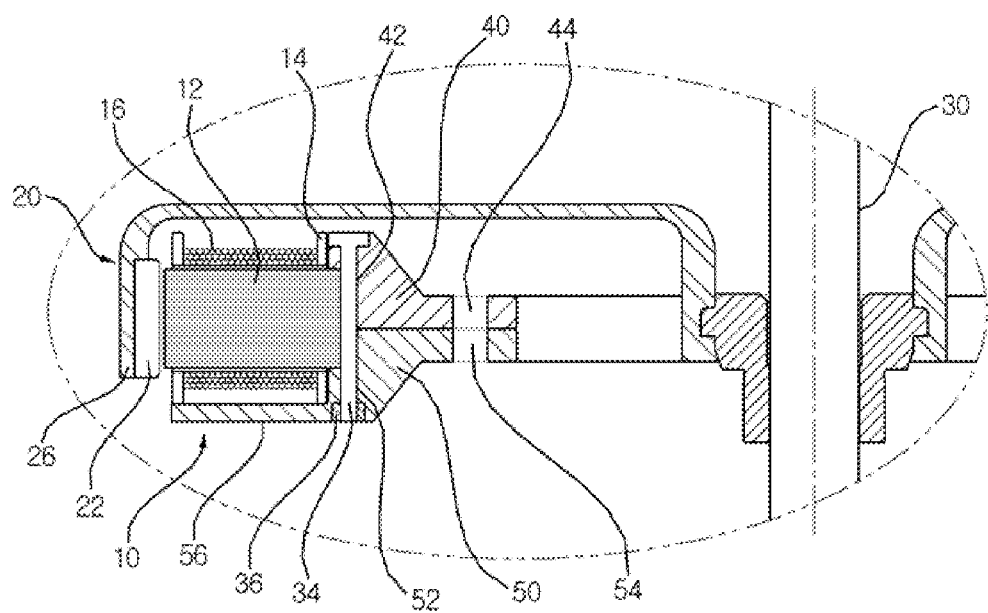
FIG. 1 is a cross-sectional view of a motor according to an embodiment of the present invention.

Hereinafter, embodiments of the present invention will be described in detail with reference to the accompanying drawings. In the process, the size and shape of the components illustrated in the drawings may be shown exaggerated for convenience and clarity of explanation. Further, by considering the configuration and operation of the present invention the specifically defined terms can be changed according to user or operator's intention, or the custom. Definitions of these terms herein need to be made based on the contents across the whole application.

FIG. 1 is a cross-sectional view of a single rotor type motor according to an embodiment of the present invention.

Referring to FIG. 1, a single rotor type motor includes a stator 10 and a rotor 20.

The motor according to the present embodiment may be mainly used in washing machines. In addition to the washing machines, the motor according to the present embodiment may be also used in other devices requiring a rotational drive force.

The rotor 20 is configured in the form of an outer rotor type disposed on the outer circumferential surface of the stator 10, and includes: a magnet 22 disposed with a certain gap from the inner surface of the stator 10; and a rotor support 26 to which the magnet 22 is fixed and at the center of which a rotating shaft 30 is mounted.

The stator 10 includes: a plurality of stator cores 12 that are divided in a plural number and radially arranged; a bobbin 14 made of an insulating material and wrapped on an outer surface of each of the stator cores 12; coils 16 wound on an outer surface of the bobbin 14; an upper fixing plate 40 on which the upper surfaces of the stator cores are radially fixed; and a lower fixing plate 50 on which the lower surfaces of the stator cores are radially fixed.

Figure 2:
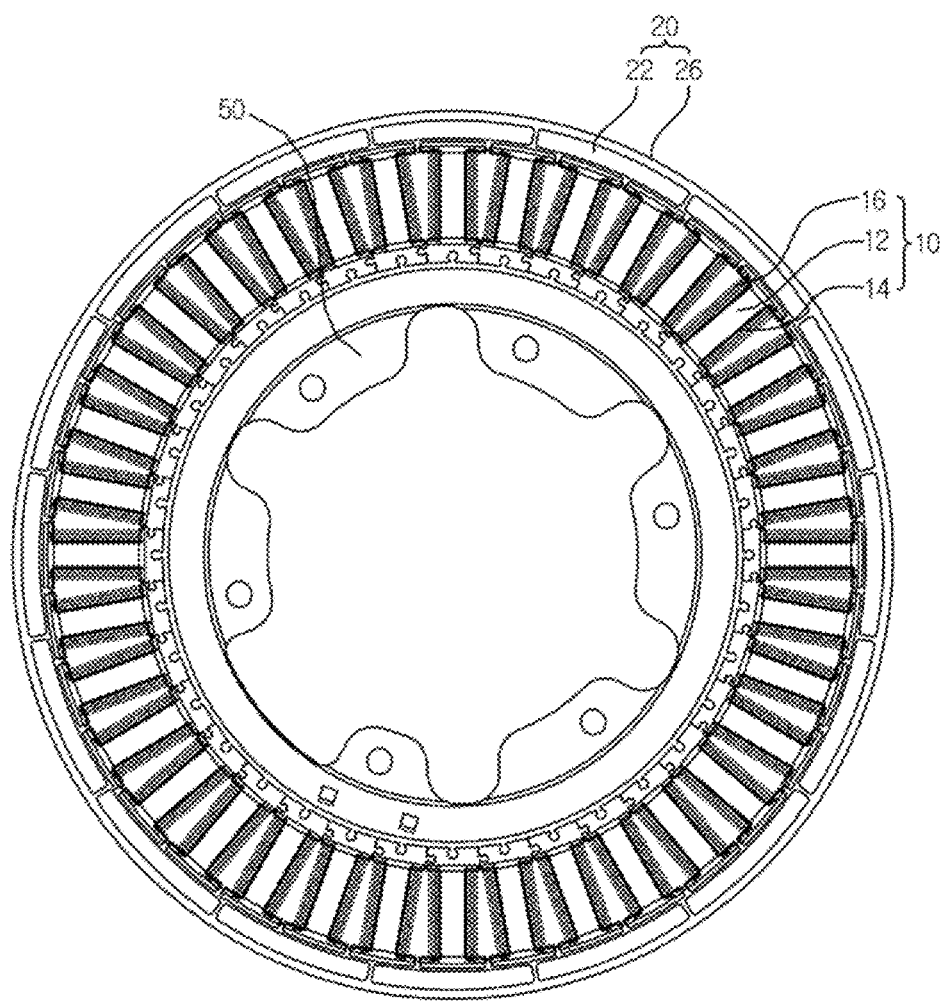
FIG. 2 is a plan view of a motor according to the embodiment of the present invention.
Figure 3:
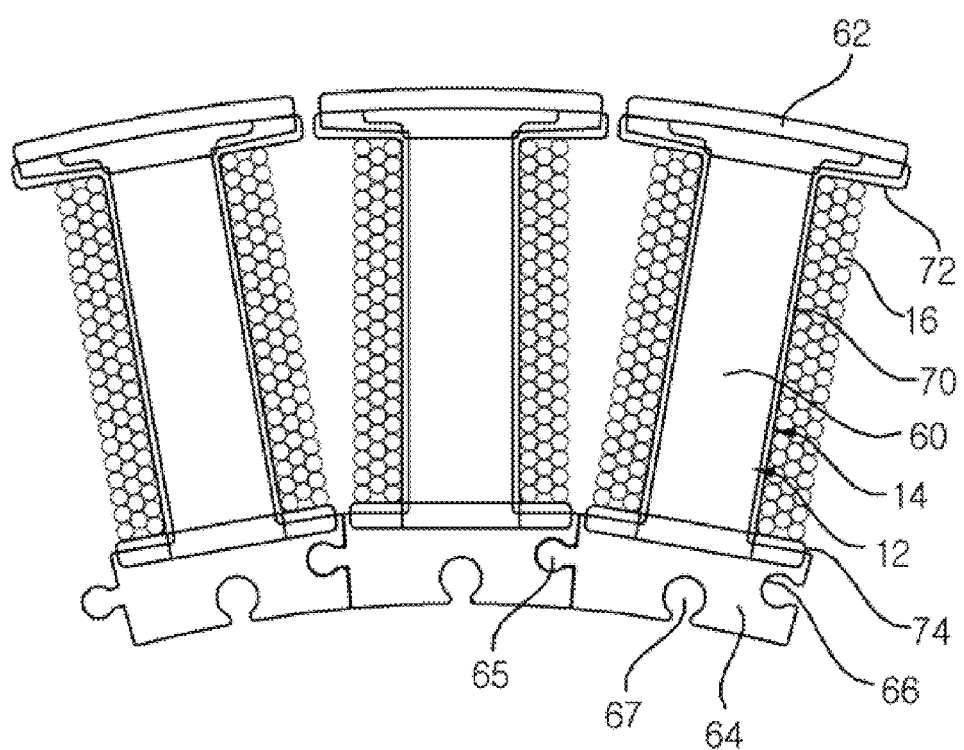
FIG. 3 is a partially enlarged view of a stator according to the embodiment of the present invention.

FIG. 2 is a plan view of a motor according to an embodiment of the present invention, and FIG. 3 is a partially enlarged view of an example of the stator according to the embodiment of the present invention.

In the embodiment of the present invention, when the stator 10 is driven by using a three-phase drive method, coil windings for a plurality of split-type stator cores 12 are successively executed for respective phases U, V, and W. When a magnetic circuit of the motor is made of, for example, a 27-slot-24-pole structure, or a 27-slot-36-pole structure, coil windings corresponding to the respective three phases U, V, and W are performed in the nine split-type stator cores for the respective phases U, V, and W.

Figure 4:
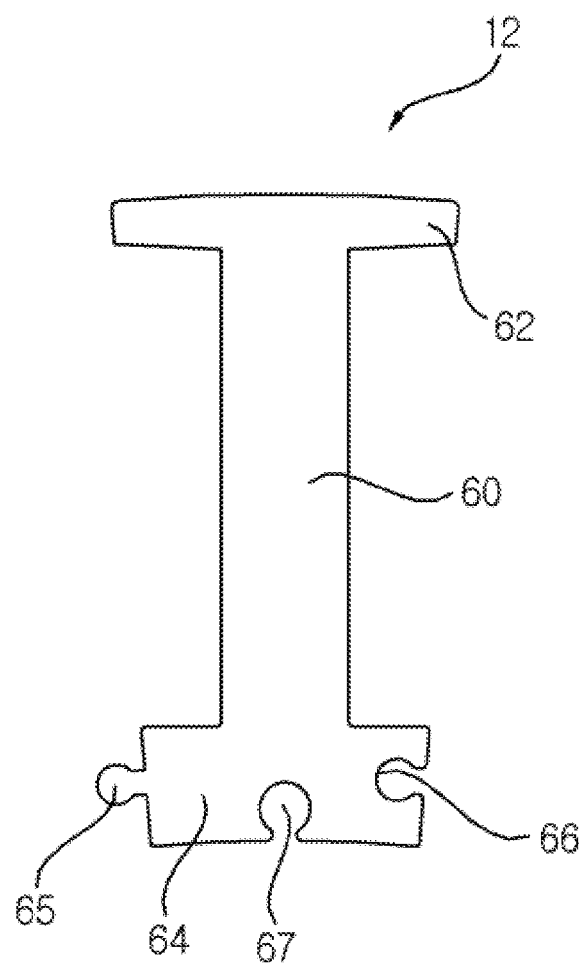
FIG. 4 is a plan view of a stator core according to the embodiment of the present invention.

As shown in FIG. 4, the stator core 12 includes: a rod portion 60 of a plate shape having a certain width and around which coils 16 are wound; an outer tooth portion 62 that is extensibly formed in a bilateral direction on the outer end of the rod portion 60 and that is disposed facing a magnet 22 of the rotor; and a flange portion 64 that is extensibly formed in a bilateral direction on the inner end of the rod portion 60.

The flange portion 64 is configured to include: connecting portions 65 and 66 that electrically connect between the stator cores 12 that are radially arranged to thus form a magnetic circuit, and that mutually connect between the stator cores 12 so that the stator cores 12 are radially arranged, and a bolt fastening hole 67 for mutually coupling the stator core 12, the upper fixing plate 40, and the lower fixing plate 50.

Here, the connecting portions 65 and 66 are configured to include: a coupling protrusion 65 that is formed at one end of the flange portion 64; and a coupling groove 66 that is formed at the other end of the flange portion 64, and into which a coupling protrusion 65 of another stator core that is disposed adjacently to the stator core 12 is inserted and coupled.

Figure 5:
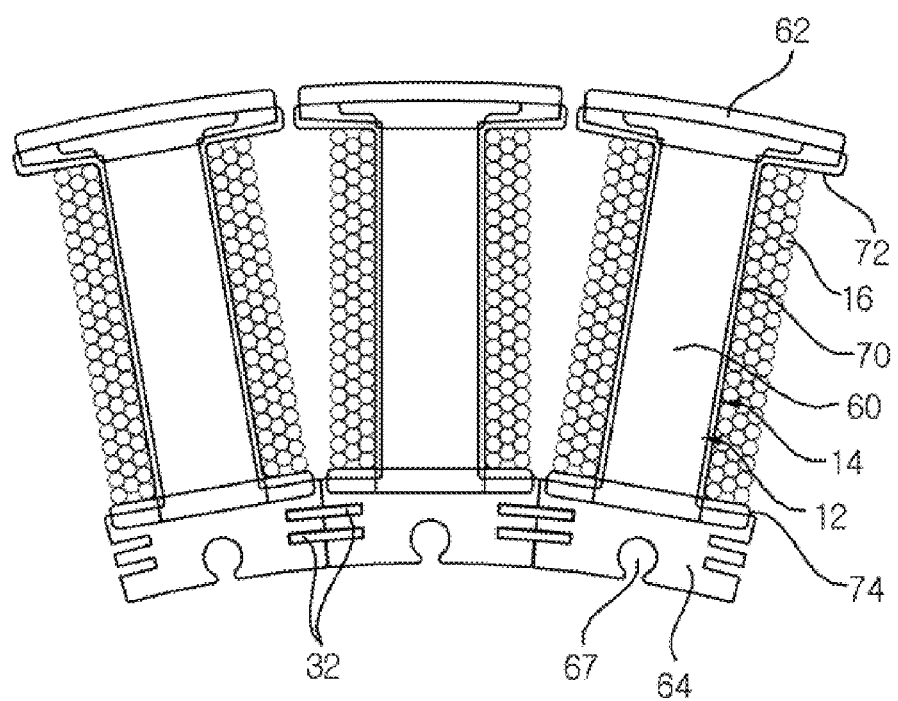
FIG. 5 is a partially enlarged view of a stator according to another embodiment of the present invention.

Further, in addition to such a structure, the connecting portions 65 and 66 are also configured to have another structure that pin holes that are formed at both sides of the flange portion 64 in which pin members are fitted between the pin holes of two adjacent stator cores 12 at a state where the two adjacent stator cores 12 are in contact with each other, to thereby connect between the two adjacent stator cores 12. Meanwhile, as shown in FIG. 5, the connecting portions 65 and 66 are also configured to have another structure that recess portions that are formed at both sides of the flange portion in which the recess portions of two adjacent stator cores 12 are caulked by using a caulking member 32 at a state where the two adjacent stator cores 12 are in contact with each other, to thereby connect between the two adjacent stator cores 12.

The bolt fastening hole 67 is a throughhole formed on the front surface of the flange portion 64. After having stacked the stator cores 12, the upper fixing plate 40 is disposed on the front surfaces of the stator cores 12 and the lower fixing plate 50 is disposed on the rear surfaces of the stator cores 12. Then, a fastening bolt 34 is inserted into the bolt fastening hole 67, and then a nut 36 is coupled at the end of the fastening bolt 34, to thereby complete an assembly of the stator cores 12 by tightening the fastening bolt 34 and the nut 36.

As described above, since the motor according to this embodiment is a single rotor type motor in which only a single rotor 20 is disposed on one surface of the stator 10, an outer tooth portion 62 facing the magnet 22 of the rotor 20 is formed on one surface of the stator core 12 and no magnets are disposed on the other surface of the stator core 12. Accordingly, the connecting portions 65 and 66 and the bolt fastening hole 67 can be formed on the other surface of the stator core 12, to thus enable an easy and simplified assembly.

Further, in the case of the motor according to this embodiment, the bolt fastening hole 67 is formed in the stator core 12, and thus the upper fixing plate 40, the lower fixing plate 50, and the stator core 12 can be fastened with the fastening bolt 34. Accordingly, no insert molding work is required after the stator cores 12 are arranged into a mold, to thereby simplify the manufacturing process, eliminate tolerances at the time of performing insert molding, and solve a problem of coil disconnection when the stator cores are inserted into the mold.

The bobbin 14 includes: a coil winding portion 70 that is formed to be wrapped around the outer circumferential surface of a plurality of rod portions 50 in a state where the rod portions 60 are stacked and around which coils 16 are wound; a first extension portion 72 that is formed on the outer end of the coil winding portion 70 and surrounds a part of the outer tooth portion 62; and a second extension portion 74 that is formed on the inner end of the coil winding portion 70 and surrounds a part of the flange portion 64.

Figure 6:
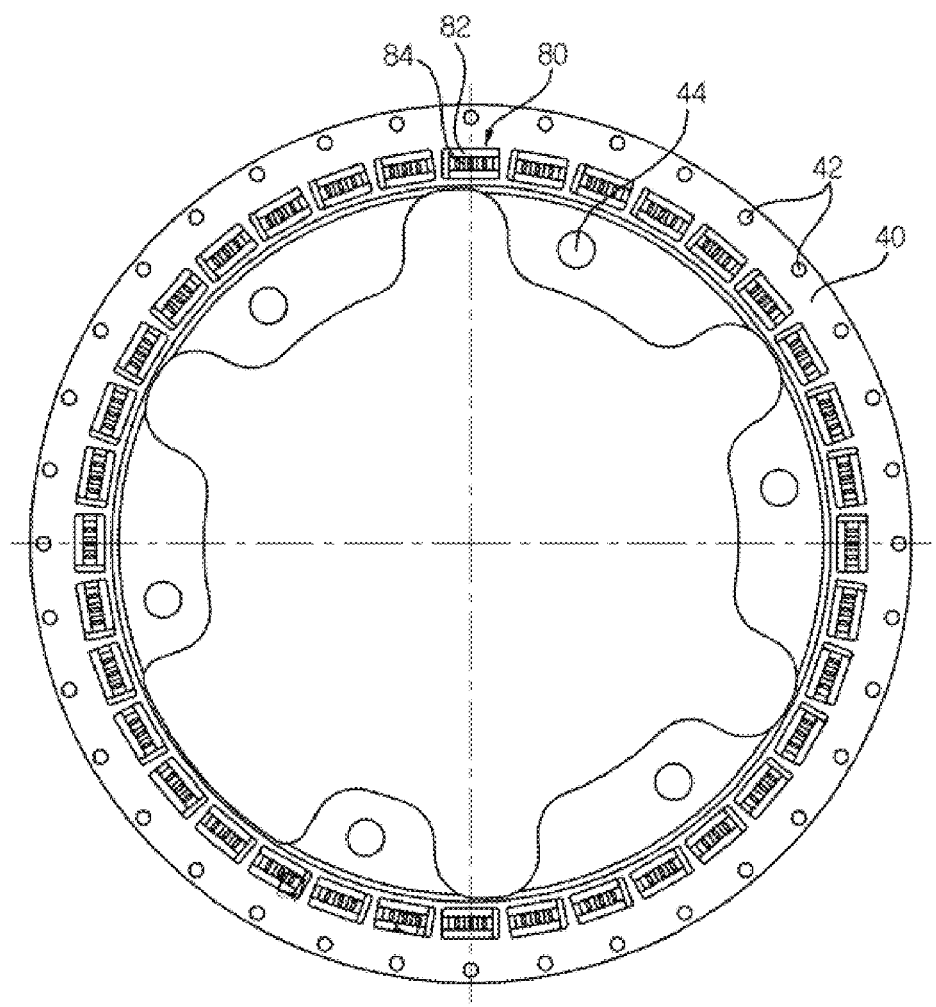
FIG. 6 is a plan view of an upper fixing plate according to an embodiment of the present invention.

As shown in FIG. 6, the upper fixing plate 40 is configured in the form of a disc whose central portion is opened, in which first fastening bolt holes 42 that are coupled with the stator cores 12 by a fastening bolt are formed at predetermined intervals on the outer circumferential surface of the upper fixing plate 40 and first fixing holes 44 that are coupled with the lower fixing plate 50 and further fixes a drive motor to an apparatus such as a washing machine are formed at predetermined intervals on the inner circumferential surface of the upper fixing plate 40.

The lower fixing plate 50 is configured in the form of a disc whose central portion is opened, in which second fastening bolt holes 52 that are disposed on the lower surface of the stator cores 12 and are communicated from the bolt fastening holes 67 of the stator cores 12 are formed at predetermined intervals in the circumferential direction of the lower fixing plate 50 and second fixing holes 54 that are in contact with the lower surface of the upper fixing plate 40 and are communicated from the first fastening holes 44 are formed at predetermined intervals in the circumferential direction of the lower fixing plate 50. Further, the lower fixing plate 50 is integrally formed with a cover portion 56 extending from the outer surface of the stator 10 and covering the lower surfaces of the stator cores 12.

A plurality of wiring units 80 that connect between coils for electrically connecting between the coils 16 wound on the respective stator cores 12 are mounted on the upper fixing plate 40.

Figure 7:
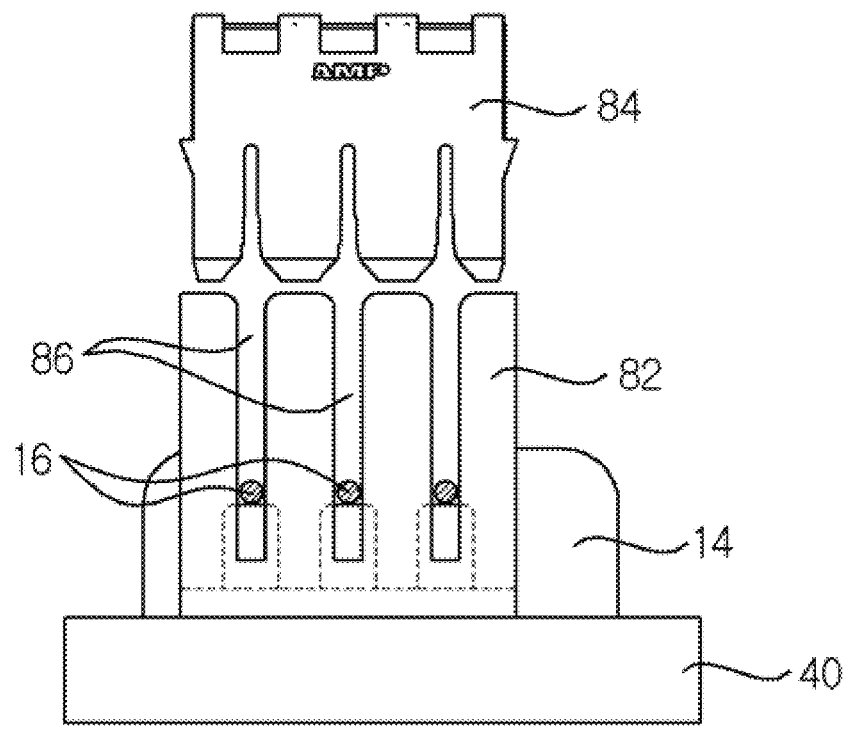
FIG. 7 is a side view of a wiring unit according to an embodiment of the present invention.
Figure 8:
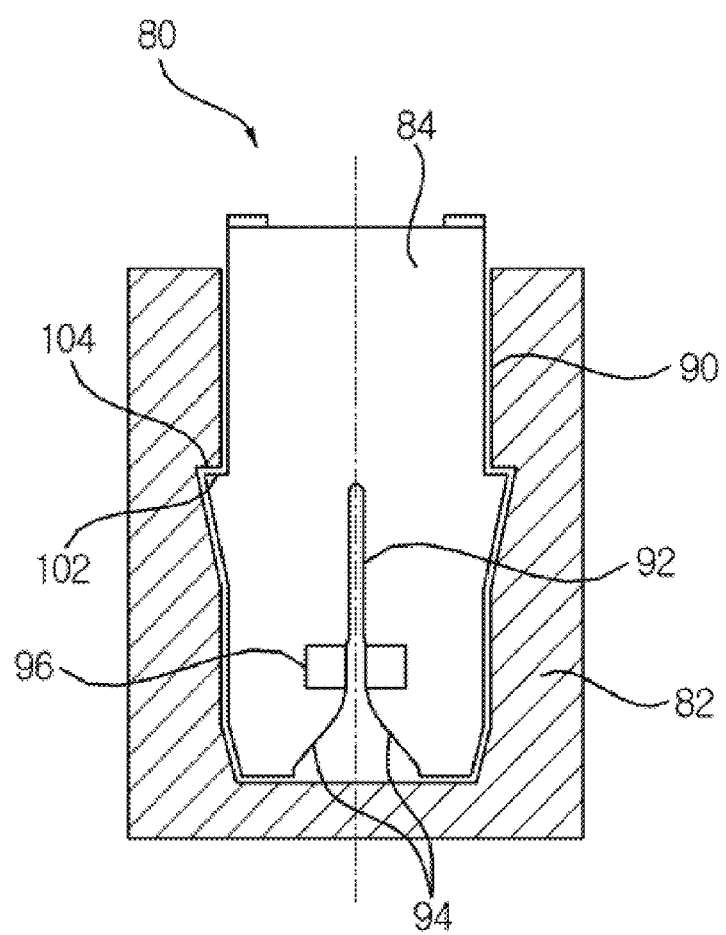
FIG. 8 is a cross-sectional view of the wiring unit according to the embodiment of the present invention.

As shown in FIGS. 7 and 8, each of the wiring units 80 includes: a terminal pocket 82 that is integrally formed with the upper surface of the upper fixing plate 40 so that the ends of two or three strands of coils 16 are inserted into the terminal pocket 82; and a coil terminal 84 that is inserted into the terminal pocket 82 for electrically connecting between the coils 16.

One of a plurality of the wiring units 80 is used to form the neutral point NP at which three-phase coils of U, V, and W phases are mutually wired.

Here, the terminal pocket 82 is integrally formed with the upper fixing plate 40 on the upper surface of the upper fixing plate 40, and includes: a plurality of seating grooves 86 that are formed at equal intervals in the circumferential direction of the upper fixing plate 40 and into the side surface of which the ends of two or three strands of coils 16 are inserted; and insertion grooves 90 whose upper surfaces are opened and into which a coil terminal 84 is inserted.

The coil terminal 84 is fitted into the insertion grooves 90 of the terminal pocket 82 and is formed of a metallic material that can be electrically energized to electrically connect between the coils 16. A plurality of slots 92 into which coils are press-fitted are formed at the lower side of the coil terminal 84. A blade 94 is formed on both side ends of each of the slots 92, and thus plays a peel-off role of peeling off an insulating outer sheath surrounding the outer surface of the coil 16 when the coil 16 is press-fitted into the slot 92.

Further, a coil fixing groove 96 with which the coil 16 is fitted and fixed is formed on the inside of the slot 92.

A locking projection 102 is formed on the side of the coil terminal 84 and a locking recess 104 with which the locking projection 102 is locked is formed on the inner surface of the terminal pocket 82. Thus, when the coil terminal 84 is inserted into the terminal pocket 82, the locking projection 102 is in engagement with the locking recess 104, to thus prevent the coil terminal 84 from being seceded from the terminal pocket 82.

An assembly process of assembling the stator cores according to the embodiment of the present invention that is configured as described above will follow.

First, after the split stator cores 12 are laminated, the bobbin 14 is formed on the outer surfaces of the split stator cores 12 by insert molding. Then, the coils 16 are wound on the outer circumferential surface of the bobbin 14.

Then, the stator cores 12 are radially arranged the upper surface of the lower fixing plate 50, and the upper fixing plate 40 is seated on the upper surface of the radially arranged stator cores 12. Then, the fastening bolt 34 is made to pass through the first fastening hole 42 of the upper fitting plate 40, the bolt fastening holes 67 formed in the stator cores 12, and the second fastening holes 52 of the lower fixing plate 50, the nut 36 is coupled with the fastening bolt 34 to thereby tighten and couple the upper fixing plate 40, the stator cores 12 and the lower fixing plate 50.

Then, the ends of the coils 16 wound on the respective stator cores 12 are connected with the wiring units 80 formed on the upper fixing plate 40, to thus connect between the coils 16.

That is, the ends of the coils 16 are seated on the respective seating grooves 86 of the terminal pocket 82. Then, the coil terminal 84 is inserted into the insertion grooves 90 of the terminal pocket 82, and thus the coils 16 are fitted into the slots 92. Here, since the slots 92 are narrow, the insulating outer sheaths of the coils 16 are peeled off by the blade 94 formed at the ends of the slots 92, and only the coils 16 whose insulating outer sheaths have been peeled off are press-fitted into the slots 92. Further, the coils 16 are respectively fixed in the coil fixing grooves 96 formed in the slots 92.

As described above, the single rotor type motor according to the embodiment of the present invention is configured so that the terminal pocket is arranged on the outer surface of the upper fixing plate, to thus secure a sufficient space in which the terminal pocket can be placed and to thereby solve the coil disconnection problem.

Further, the single rotor type motor according to the embodiment of the present invention is configured so that the blade is formed on the coil terminal. Thus, when the coil terminal is inserted into the terminal pocket, the insulating outer sheaths of the coils are peeled off by the blade, and thus no further action of peeling off the insulating outer sheaths of the coils is required to improve the assembly of the motor.

As described above, the present invention has been described with respect to particularly preferred embodiments. However, the present invention is not limited to the above embodiments, and it is possible for one of ordinary skill in the art to make various modifications and variations, without departing off the spirit of the present invention. Thus, the protective scope of the present invention is not defined within the detailed description thereof but is defined by the claims to be described later and the technical spirit of the present invention.

The present invention may be applied to a single rotor type motor in which wiring units for electrically connecting between stator coils are placed on fixing plates on which stator cores are fixed, to thus make it easy to assemble the motor and solve a coil disconnection problem.

What is claimed is:

1. A single rotor type motor comprising:
   a stator including a plurality of stator cores that are split and radially arranged, a bobbin made of an insulating material and wrapped on an outer surface of each of the stator cores, coils wound on an outer surface of the bobbin, an upper fixing plate that is disposed on the upper surfaces of the stator cores and on which the stator cores are radially arranged, and a lower fixing plate that is disposed on the lower surfaces of the stator cores and is coupled with the upper fixing plate, the stator cores being fastened to both the upper fixing plate and the lower fixing plate,
   wherein the stator core comprises:
   a rod portion of a plate shape and around which the coils are wound;
   a tooth portion that is extensibly formed in a lateral direction on one end of both ends of the rod portion and that is disposed facing a magnet of the rotor; and
   a flange portion that is formed at the other side end of the rod portion, in which the flange portion comprises: a connecting portion for mutually connecting between the stator cores; and a bolt fastening hole for coupling the stator core, the upper fixing plate, and the lower fixing plate with a fastening bolt; and
   a single rotor disposed with a certain gap from any one surface of an inner surface of the stator and an outer surface thereof,
   wherein a plurality of wiring units for electrically connecting between the coils wound around each of the stator cores are formed integrally on the upper surface of the upper fixing plate,
   wherein each of the wiring units comprises: a terminal pocket that is integrally formed on the upper surface of the upper fixing plate and into which the coils are inserted; and a coil terminal that is made of a metallic material that can be electrified and is inserted into the terminal pocket for electrically connecting between the coils, and
   wherein the lower fixing plate is configured in the form of a disc whose central portion is opened, in which first fastening bolt holes that are communicated from and coupled with the bolt fastening holes of the stator cores are formed at predetermined intervals in a circumferential direction of the lower fixing plate, first fixing holes that are in contact with a lower surface of the upper fixing plate and are communicated from the first fastening holes are formed at predetermined intervals in the circumferential direction of the lower fixing plate, and a cover portion extending from an outer surface of the stator and covering the lower surfaces of the stator cores is formed.

2. The single rotor type motor of claim 1, wherein the upper fixing plate is configured in the form of a disc whose central portion is opened, in which second fastening bolt holes that are communicated and coupled with the bolt fastening holes of the stator cores by the fastening bolt are formed at predetermined intervals on an outer circumferential surface of the upper fixing plate and second fixing holes that are coupled with the lower fixing plate and further fixed to an apparatus are formed at equal intervals on an inner circumferential surface of the upper fixing plate.

3. The single rotor type motor of claim 1, wherein one of a plurality of wiring units is used to form the neutral point (NP) at which three-phase coils of U, V, and W phases are mutually wired.

4. The single rotor type motor of claim 1, wherein the terminal pocket is integrally molded when the upper fixing plate is insert molded, and is provided with a plurality of seating grooves on the side surface of the terminal pocket, and insertion grooves into which the coil terminal is inserted in the inside of the terminal pocket.

5. The single rotor type motor of claim 1, wherein the coil terminal is formed of a plurality of slots into which coils are press-fitted at the lower side of the coil terminal, in which a blade is formed on both side ends of each of the slots and thus plays a peel-off role of peeling off an insulating outer sheath surrounding the outer surface of the coil when the coil is press-fitted into the slot.

* * * * *